United States Patent
Seibel et al.

(10) Patent No.: US 11,424,931 B2
(45) Date of Patent: Aug. 23, 2022

(54) TRUSTED EXECUTION ENVIRONMENT

(71) Applicant: BlackBerry Limited, Waterloo (CA)

(72) Inventors: James Seibel, Boston, MA (US); Kevin LaFlamme, Boston, MA (US); Fred Koschara, Boston, MA (US); Reinhard Schumak, Boston, MA (US); Jeremy Debate, Boston, MA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/007,547

(22) Filed: Jan. 27, 2016

(65) Prior Publication Data
US 2017/0214530 A1 Jul. 27, 2017

(51) Int. Cl.
H04L 9/32 (2006.01)
H04L 9/40 (2022.01)
(Continued)

(52) U.S. Cl.
CPC ............ H04L 9/3234 (2013.01); G06F 21/53 (2013.01); G06F 21/606 (2013.01);
(Continued)

(58) Field of Classification Search
CPC . H04L 9/3234; H04L 63/061; H04L 63/0853; H04L 63/0876; H04L 67/10; G06F 21/53; G06F 21/606
See application file for complete search history.

(56) References Cited

U.S. PATENT DOCUMENTS 6,216,175 B1 4/2001 Sliger et al.
6,260,190 B1 7/2001 Ju
(Continued)

FOREIGN PATENT DOCUMENTS

CN 1942845 A 4/2007
CN 101971186 A 2/2011
(Continued)

OTHER PUBLICATIONS

Search Query Report from IP.com (performed Apr. 30, 2020).*
(Continued)

Primary Examiner — Sharon S Lynch
(74) Attorney, Agent, or Firm — Conley Rose, P. C.; J. Robert Brown, Jr.

(57) ABSTRACT

A trusted execution environment on a computing device within an enterprise, whether owned by the enterprise or the employee/user, allows invocation of trusted enterprise applications without hindering external or non-enterprise apps from running on the same computing device. Each of the trusted apps can interact with other trusted apps on the same enterprise computing device in a trusted manner such that other apps or untrusted network connections are prevented for access to the trusted apps. The computing device, however, also executes non enterprise applications which operate independently of the enterprise apps in the same address space using the same unmodified operating system as the enterprise apps on the computing device. The trusted execution environment therefore restricts interprocess communication to be only within the set of enterprise apps and also permits unimpeded operation of other apps under the same OTS (off the shelf) operating system.

14 Claims, 6 Drawing Sheets

(51) Int. Cl.
  *G06F 21/53*   (2013.01)
  *G06F 21/60*   (2013.01)
  *H04L 67/10*   (2022.01)

(52) U.S. Cl.
  CPC ........ *H04L 63/061* (2013.01); *H04L 63/0853* (2013.01); *H04L 63/0876* (2013.01); *H04L 67/10* (2013.01)

(56) References Cited

U.S. PATENT DOCUMENTS

| | | | |
|---|---|---|---|
| 6,470,450 B1* | 10/2002 | Langford | G06F 21/602 713/182 |
| 6,915,510 B1 | 7/2005 | Tock et al. | |
| 6,948,164 B2 | 9/2005 | Tinker | |
| 7,178,021 B1* | 2/2007 | Hanna | G06F 21/6209 713/150 |
| 7,590,738 B2 | 9/2009 | Mendonca | |
| 7,716,467 B1* | 5/2010 | Deffet | H04L 63/0272 713/153 |
| 7,725,890 B2 | 5/2010 | Kawaura | |
| 7,765,579 B2 | 7/2010 | Wallace | |
| 7,779,394 B2 | 8/2010 | Homing et al. | |
| 8,225,308 B2 | 7/2012 | Sedukhin et al. | |
| 8,286,241 B1* | 10/2012 | Yeo | H04L 63/101 726/11 |
| 8,473,724 B1 | 6/2013 | Kenville et al. | |
| 8,595,810 B1* | 11/2013 | Ben Ayed | H04W 12/0608 726/8 |
| 8,607,200 B2 | 12/2013 | Kunze | |
| 8,869,235 B2* | 10/2014 | Qureshi | H04L 63/20 713/150 |
| 8,887,141 B2 | 11/2014 | Day et al. | |
| 8,898,620 B2 | 11/2014 | Eizenman et al. | |
| 9,009,790 B2* | 4/2015 | Wuthnow | H04L 67/306 713/168 |
| 9,037,870 B1* | 5/2015 | Zheng | G06F 12/1408 380/273 |
| 9,111,105 B2* | 8/2015 | Barton | H04W 12/37 |
| 9,111,276 B2 | 8/2015 | Haller | |
| 9,112,854 B1* | 8/2015 | Bhimanaik | H04L 63/0823 |
| 9,208,328 B2 | 12/2015 | Russello et al. | |
| 9,224,001 B2* | 12/2015 | Ayyalasomayajula | H04W 8/245 |
| 9,246,690 B1* | 1/2016 | Roth | H04L 9/3268 |
| 9,286,477 B2* | 3/2016 | Sobel | G06F 21/604 |
| 9,354,849 B2 | 5/2016 | Debate et al. | |
| 9,355,060 B1 | 5/2016 | Barber et al. | |
| 9,515,999 B2* | 12/2016 | Ylonen | H04L 63/062 |
| 9,529,996 B2* | 12/2016 | Qureshi | G06F 21/53 |
| 9,626,525 B2* | 4/2017 | Momchilov | H04L 63/0861 |
| 9,635,001 B2* | 4/2017 | Kaseda | H04L 63/045 |
| 9,866,382 B2* | 1/2018 | Wagner | H04L 9/30 |
| 10,031,783 B2 | 7/2018 | Jalagam et al. | |
| 10,205,710 B2* | 2/2019 | Mitchell | H04L 9/3247 |
| 10,225,287 B2 | 3/2019 | Aamir et al. | |
| 10,303,879 B1* | 5/2019 | Potlapally | G06F 21/57 |
| 10,341,327 B2* | 7/2019 | Kola | H04L 9/3268 |
| 10,467,421 B2* | 11/2019 | Aamir | H04L 63/0815 |
| 2002/0073398 A1 | 6/2002 | Tinker | |
| 2002/0087956 A1 | 7/2002 | Darlet | |
| 2003/0033521 A1* | 2/2003 | Sahlbach | H04L 9/3263 713/156 |
| 2003/0079120 A1* | 4/2003 | Hearn | G06F 21/10 713/150 |
| 2004/0015927 A1 | 1/2004 | Haber et al. | |
| 2004/0237067 A1 | 11/2004 | Sun et al. | |
| 2005/0081029 A1* | 4/2005 | Thornton | H04L 63/0823 713/156 |
| 2005/0182966 A1* | 8/2005 | Pham | G06F 21/51 726/5 |
| 2005/0262568 A1* | 11/2005 | Hansen | G06F 21/10 726/26 |
| 2006/0150256 A1* | 7/2006 | Fanton | G06F 21/10 726/27 |
| 2006/0161768 A1 | 7/2006 | Baissus et al. | |
| 2007/0006163 A1 | 1/2007 | Aoki et al. | |
| 2007/0074169 A1 | 3/2007 | Chess et al. | |
| 2007/0271459 A1* | 11/2007 | Gomez | H04L 63/0442 713/171 |
| 2008/0059787 A1* | 3/2008 | Hohenberger | H04L 9/3013 713/153 |
| 2008/0184225 A1 | 7/2008 | Fitzgerald et al. | |
| 2009/0037921 A1 | 2/2009 | Simpson et al. | |
| 2009/0089766 A1 | 4/2009 | Day et al. | |
| 2009/0094596 A1 | 4/2009 | Kuiper et al. | |
| 2009/0119653 A1 | 5/2009 | Kettley et al. | |
| 2009/0290712 A1 | 11/2009 | Henry et al. | |
| 2009/0328067 A1 | 12/2009 | Srinivasan et al. | |
| 2010/0037100 A1 | 2/2010 | Lopian | |
| 2010/0287541 A1* | 11/2010 | Saunders | G06Q 30/06 717/139 |
| 2010/0303236 A1* | 12/2010 | Laaksonen | H04L 63/062 380/270 |
| 2010/0333079 A1 | 12/2010 | Sverdlov et al. | |
| 2011/0058673 A1* | 3/2011 | Zheng | H04L 9/0833 380/255 |
| 2011/0066999 A1 | 3/2011 | Rabinovich et al. | |
| 2011/0087692 A1* | 4/2011 | Masone | G06F 8/60 707/769 |
| 2011/0154031 A1* | 6/2011 | Banerjee | G06F 21/335 713/165 |
| 2012/0023487 A1 | 1/2012 | Letca et al. | |
| 2012/0036554 A1 | 2/2012 | Golan et al. | |
| 2012/0079609 A1* | 3/2012 | Bender | G06F 21/629 726/30 |
| 2012/0124559 A1* | 5/2012 | Kondur | G06F 8/41 717/125 |
| 2012/0124659 A1* | 5/2012 | Craft | H04L 63/0807 726/9 |
| 2012/0159163 A1* | 6/2012 | von Behren | G06Q 20/3552 713/168 |
| 2012/0204032 A1* | 8/2012 | Wilkins | H04L 9/006 713/170 |
| 2012/0209923 A1* | 8/2012 | Mathur | G06F 21/53 709/206 |
| 2012/0210443 A1* | 8/2012 | Blaisdell | G06F 21/12 726/27 |
| 2012/0291103 A1* | 11/2012 | Cohen | G06F 21/6218 726/4 |
| 2012/0328105 A1* | 12/2012 | Mukkara | H04L 9/0897 380/277 |
| 2012/0331283 A1* | 12/2012 | Chandran | H04L 9/088 713/150 |
| 2013/0042222 A1 | 2/2013 | Maddela | |
| 2013/0054801 A1* | 2/2013 | Belchee | G06F 21/105 709/225 |
| 2013/0091543 A1 | 4/2013 | Wade et al. | |
| 2013/0097659 A1* | 4/2013 | Das | G06F 21/629 726/1 |
| 2013/0097660 A1* | 4/2013 | Das | G06F 21/52 726/1 |
| 2013/0212388 A1 | 8/2013 | D'Souza et al. | |
| 2013/0276056 A1 | 10/2013 | Epstein | |
| 2013/0283245 A1 | 10/2013 | Black et al. | |
| 2013/0283400 A1* | 10/2013 | Schneider | G06F 21/572 726/30 |
| 2014/0006773 A1* | 1/2014 | Chazalet | H04L 63/0428 713/153 |
| 2014/0007182 A1* | 1/2014 | Qureshi | G06F 21/10 726/1 |
| 2014/0013316 A1* | 1/2014 | Kemmler | G06F 17/30607 717/170 |
| 2014/0032691 A1* | 1/2014 | Barton | H04L 41/00 709/206 |
| 2014/0032759 A1* | 1/2014 | Barton | H04L 67/10 709/225 |
| 2014/0040979 A1* | 2/2014 | Barton | H04L 63/20 726/1 |
| 2014/0059525 A1 | 2/2014 | Jawa et al. | |

(56) References Cited

U.S. PATENT DOCUMENTS

| | | | | |
|---|---|---|---|---|
| 2014/0068273 | A1* | 3/2014 | Sobel | G06F 21/604 |
| | | | | 713/189 |
| 2014/0068593 | A1* | 3/2014 | McErlane | G06F 8/61 |
| | | | | 717/171 |
| 2014/0090077 | A1* | 3/2014 | Jeong | G06F 21/51 |
| | | | | 726/26 |
| 2014/0095874 | A1* | 4/2014 | Desai | H04L 63/126 |
| | | | | 713/168 |
| 2014/0098449 | A1 | 4/2014 | Hellberg et al. | |
| 2014/0122880 | A1* | 5/2014 | Krishnaswamy | H04L 63/08 |
| | | | | 713/168 |
| 2014/0123207 | A1 | 5/2014 | Agarwal et al. | |
| 2014/0165049 | A1 | 6/2014 | Diamos et al. | |
| 2014/0177839 | A1* | 6/2014 | Wagner | H04L 9/0822 |
| | | | | 380/259 |
| 2014/0181518 | A1* | 6/2014 | Kim | G06F 21/606 |
| | | | | 713/168 |
| 2014/0181522 | A1* | 6/2014 | Tanizawa | H04L 63/06 |
| | | | | 713/171 |
| 2014/0181801 | A1 | 6/2014 | Voronkov et al. | |
| 2014/0250511 | A1* | 9/2014 | Kendall | H04W 12/0027 |
| | | | | 726/6 |
| 2014/0282446 | A1* | 9/2014 | Debate | G06F 8/41 |
| | | | | 717/145 |
| 2015/0040246 | A1* | 2/2015 | Yuen | H04L 63/168 |
| | | | | 726/30 |
| 2015/0046712 | A1* | 2/2015 | Korkishko | H04L 9/0869 |
| | | | | 713/170 |
| 2015/0169877 | A1* | 6/2015 | Mahaffey | G06F 21/57 |
| | | | | 726/22 |
| 2015/0172060 | A1* | 6/2015 | Mahaffey | G06F 21/57 |
| | | | | 713/176 |
| 2015/0172146 | A1* | 6/2015 | Mahaffey | G06F 8/70 |
| | | | | 709/224 |
| 2015/0222604 | A1* | 8/2015 | Ylonen | H04L 63/062 |
| | | | | 713/171 |
| 2015/0319144 | A1* | 11/2015 | Barton | G06F 9/485 |
| | | | | 713/168 |
| 2015/0326567 | A1 | 11/2015 | Hamburg et al. | |
| 2016/0072629 | A1* | 3/2016 | Kulkarni | G06F 9/468 |
| | | | | 713/176 |
| 2016/0119292 | A1* | 4/2016 | Kaseda | H04L 63/0464 |
| | | | | 713/165 |
| 2016/0191499 | A1* | 6/2016 | Momchilov | H04L 9/0863 |
| | | | | 713/171 |
| 2016/0191645 | A1* | 6/2016 | Hayton | H04L 67/2842 |
| | | | | 709/203 |
| 2016/0283406 | A1* | 9/2016 | Linga | H04L 9/0816 |
| 2017/0012953 | A1* | 1/2017 | Ylonen | H04L 63/062 |
| 2017/0019386 | A1* | 1/2017 | Ylonen | H04L 63/062 |
| 2017/0019387 | A1* | 1/2017 | Ylonen | H04L 63/062 |
| 2017/0041349 | A1* | 2/2017 | Ylonen | H04L 63/062 |
| 2017/0063975 | A1* | 3/2017 | Prakash | H04L 67/1002 |
| 2017/0094509 | A1* | 3/2017 | Mistry | H04W 12/0608 |
| 2017/0116424 | A1* | 4/2017 | Aamir | H04L 9/083 |
| 2017/0163689 | A1* | 6/2017 | Ylonen | H04L 63/062 |
| 2017/0171175 | A1* | 6/2017 | Ylonen | H04L 63/062 |
| 2017/0222995 | A1* | 8/2017 | Ylonen | H04L 63/062 |
| 2017/0366580 | A1* | 12/2017 | Ylonen | H04L 63/062 |
| 2017/0366581 | A1* | 12/2017 | Ylonen | H04L 63/062 |
| 2018/0025180 | A1* | 1/2018 | Wang | G06F 21/6281 |
| | | | | 726/1 |
| 2019/0005229 | A1* | 1/2019 | Hlaing | H04W 12/041 |
| 2019/0075134 | A1* | 3/2019 | Ylonen | H04L 63/062 |
| 2020/0089869 | A1* | 3/2020 | Richardson | H04W 12/37 |

FOREIGN PATENT DOCUMENTS

| | | |
|---|---|---|
| CN | 103347020 A | 10/2013 |
| CN | 104392188 A | 3/2015 |
| CN | 104965732 A | 10/2015 |
| EP | 2746981 A1 | 6/2014 |
| EP | 2743855 † | 5/2017 |
| WO | 2010029362 A2 | 3/2010 |
| WO | 2014052917 A1 | 4/2014 |
| WO | 2015196967 A1 | 12/2015 |

OTHER PUBLICATIONS

Search Query Report from IP.com (performed Sep. 30, 2020) (Year: 2020).*
Search Query Report from IP.com (performed Apr. 9, 2021) (Year: 2021).*
Search Query Report from IP.com (performed Sep. 28, 2021) (Year: 2021).*
Search Query Report from IP.com (performed Apr. 14, 2022). (Year: 2022).*
Office Action dated Aug. 2, 2017; U.S. Appl. No. 15/013,438, filed Feb. 2, 2016; 32 pages.
European Extended Examination Report; Application No. 17152587.6; dated Jun. 23, 2017; 7 pages.
European Extended Examination Report; Application No. 17153148.6; dated May 22, 2017; 8 pages.
Seibel, James, et al.; U.S. Appl. No. 15/013,438, filed Feb. 2, 2016; Title: Application Lifecycle Operation Queuing; 24 pages.
Office Action dated Jan. 7, 2015; U.S. Appl. No. 14/208,068, filed Mar. 13, 2014; 14 pages.
Final Office Action dated Jul. 28, 2015; U.S. Appl. No. 14/208,068, filed Mar. 13, 2014; 12 pages.
Advisory Action dated Nov. 30, 2015; U.S. Appl. No. 14/208,068, filed Mar. 13, 2014; 3 pages.
Notice of Allowance dated Jan. 29, 2016; U.S. Appl. No. 14/208,068, filed Mar. 13, 2014; 18 pages.
PCT International Search Report; Application No. PCT/US2014/025397; dated Aug. 7, 2014; 2 pages.
PCT Written Opinion of the International Searching Authority; Application No. PCT/US2014/025397; dated Aug. 7, 2014; 6 pages.
Advisory Action dated Jul. 26, 2018; U.S. Appl. No. 15/013,438, filed Feb. 2, 2016; 5 pages.
Final Office Action dated May 11, 2018; U.S. Appl. No. 15/013,438, filed Feb. 2, 2016; 35 pages.
Office Action dated Jan. 14, 2019; U.S. Appl. No. 15/013,438, filed Feb. 2, 2016; 26 pages.
An, Lianjun, et al.; "Effective Workforce Lifecycle Management via System Dynamics Modeling and Simulation"; IEEE; Proceedings of the 2007 Winter Simulation Conference; Dec. 9-12, 2007; 9 pages.
Etkin, Joshua, et al.; "Development Life Cycle of Computer Networks: The Executable Model Approach"; IEEE Transactions on Software Engineering; vol. 15, No. 9; Sep. 1989; 12 pages.
McCalla, Clement, et al.; "A Time-Dependent Queueing-Network Model to Describe the Life-Cycle Dynamics of Private-Line Telecommunication Services"; Telecommunication Systems; vol. 19, No. 1; Jan. 2002; 30 pages.
Narayan, Vish; "Application Integration Environment for Messaging/Queueing Model"; IEEE; Proceedings ISADS 95. Second International Symposium on Autonomous Decentralized Systems; Apr. 25-27, 1995; 6 pages.
Notice of Allowance dated Jul. 29, 2019; U.S. Appl. No. 15/013,438, filed Feb. 2, 2016; 15 pages.
European Examination Report; Application No. 17152587.6; dated Apr. 5, 2019; 6 pages.
Notice of Allowance dated Nov. 7, 2019; U.S. Appl. No. 15/013,438, filed Feb. 2, 2016; 12 pages.
Chinese Office Action Application No. 201710057013.6; dated Jul. 5, 2021; 14 pages.
European Examination Report; Application No. 17152587.6; dated Mar. 30, 2020; 6 pages.

\* cited by examiner
† cited by third party

TRUSTED EXECUTION ENVIRONMENT

BACKGROUND

Computer security, particularly to safeguard the proprietary and sensitive data of corporations and other enterprises, has become increasingly scrutinized as more and more data travels electronically over public access networks. An enterprise or other organization, however, with many employees or members presents a particular vulnerability, as any user may be leveraged to obtain access. Further, such enterprises may employ a common set of applications on computing devices of each individual user. It is problematic to mandate and enforce exclusive corporate usage of these personal devices; as a practical matter, little control can be exercised over a machine in a user/employee's possession. Additional applications and activities undertaken by users can interfere with and/or compromise enterprise activities on the computing device due to common execution environments shared by the enterprise apps and user supplied apps, resulting in a vulnerability that rests upon the integrity of extraneous apps loaded by the user.

SUMMARY

A trusted execution environment on an enterprise-enabled computing device, whether owned by the enterprise or the user/employee, hereinafter called an "enterprise computing device", allows invocation of a suite of secure enterprise applications (apps) on a device without hindering external or non-enterprise apps from running on the same enterprise computing device. Each of the enterprise computing devices executes the suite of secure enterprise apps, which interact with each other in a trusted manner such that outside apps or network connections are prevented from accessing the enterprise apps. The enterprise computing device, however, also executes non enterprise applications which operate independently of the enterprise apps in the same address space, and which can communicate with other non-enterprise apps, and using the same unmodified operating system as the enterprise apps on the enterprise computing device. The trusted execution environment therefore restricts interprocess communication only between the set of enterprise apps and non-enterprise apps, and also permits unimpeded operation of other apps under the same OTS (off the shelf) operating system.

Configurations herein are based, in part, on the observation that corporations and other enterprises often employ a dedicated suite of applications or apps for handling proprietary data. Employees or members of the enterprise desire to invoke the enterprise application suite on a portable computing device along with other apps that are not directed to proprietary data. Unfortunately, conventional approaches to providing a secure or trusted application space, such as for executing the enterprise apps, suffer from the shortcoming that changes are required to the native operating system (OS) or conditionally assessing attempted memory accesses or memory partitions. Usage of a modified or custom OS presents cost and logistical issues with deployment, as well as compatibility issues with execution of other apps that are not in the dedicated suite.

Accordingly, configurations herein substantially overcome the above-described shortcomings by providing a trusted application space on a portable computing device for concurrent execution of trusted apps with other user selected or general apps with an unmodified off-the-shelf (OTS) OS for maintaining compatibility and avoiding deployment of a custom, trusted operating system.

In further detail, configurations herein provide a trusted execution environment under an unmodified, off-the-shelf (OTS) operating system on a mobile computing device by loading a plurality of applications into the memory of an execution environment on the computing device. The execution environment on the computing device has memory, a processor, a file system and a network interface, and communicates securely by designating a communication association between one of the loaded applications and a related application of the plurality of loaded applications. The method detects, by any of the loaded applications, an attempt to communicate with a recipient application of the loaded applications defining a trusted set or suite of apps. The attempted communication is disallowed if the applications do not have a designated communication association. Implementation on an unmodified, OTS OS allows loading one or more other applications into the execution environment, such that the other applications that are not designated as trusted are prevented from communicating with any of the trusted applications.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
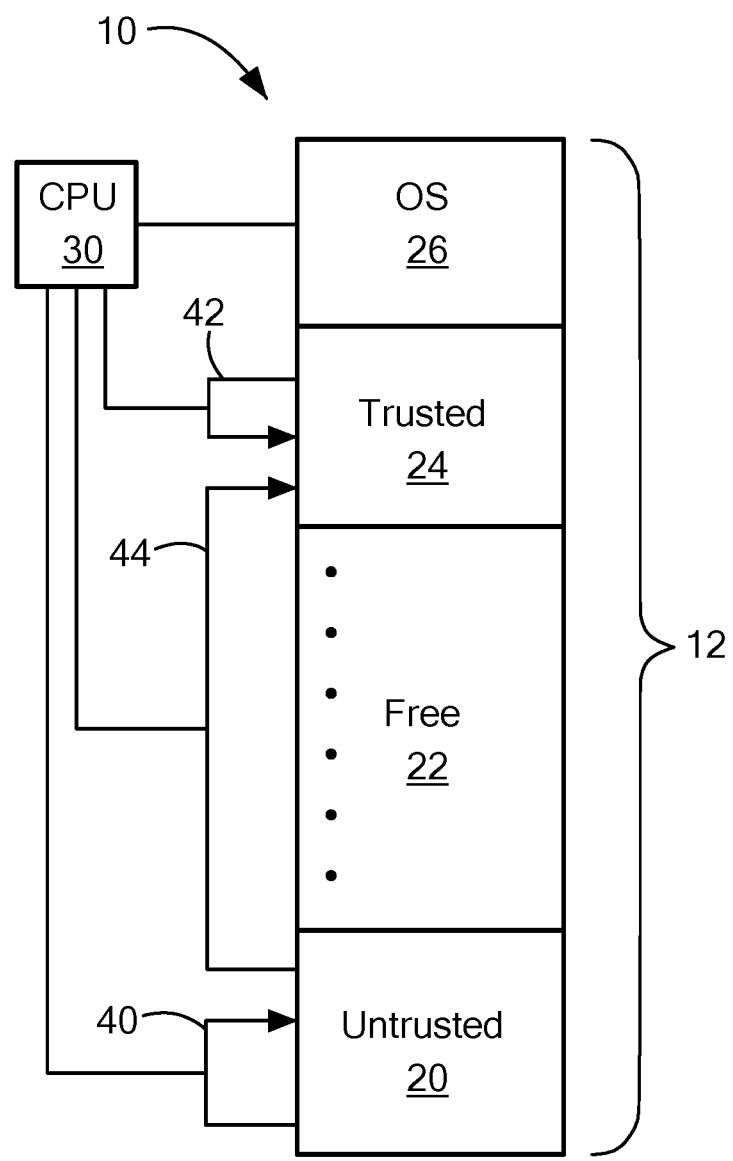
FIG. 1 is a prior art system for controlling application memory access.

Depicted below is an example of an enterprise having a plurality of portable computing devices, as might be used by employees of the enterprise, each exhibiting a secure execution environment. Examples of communication between apps in the secure execution environment depict particular features, however should not be taken to limit approaches of the invention as claimed herein. Various organizational settings may elect computing devices having a secure execution environment in a stationary, mobile, portable, handheld or other physical configuration.

The applications, or apps, as described represent an executable entity launched in the memory space of a computing device. The computing devices have an operating system such as Android™, IOS (iPhone® Operating System), WINDOWS®, Linux or other suitable platform, however it should be emphasized that the techniques disclosed herein are independent of the native OS and do not impose or require changes to the underlying OS of the computing device. The disclosed approach also employs off-the-shelf applications, such that loaded apps do not require a specialized version for compatibility with the disclosed approach.

An example configuration depicted herein provides an environment for secure applications to communicate with each other in the presence of other insecure apps. This is implemented within the applications themselves, and therefore does not rely on the operating system to provide a special trusted container. Individual processes in the trusted execution environment are wrapped to provide interception of system calls which affect communication with and invocation of other processes.

The trusted execution environment is overseen by a monitor process, or "keystore" application that manages communication between secure applications. Encryption keys are managed and distributed via the keystore application. The keystore application has an Access Control List (ACL) or other repository that indicates which applications can communicate with each other. Each application has a unique ID that is mapped to a list of IDs of other applications. A trusted application can only communicate with an application that is in its ACL.

When an application is installed, the keystore application generates a new encryption key for it. Various key generation mechanisms such as Diffie-Hellman are used to establish a trusted inter-process communication channel between the newly installed application and the keystore application (KA) in order to transfer the key. An application that wants to communicate with another application generally has two options. Either a direct communication channel can be established, or the app can write a file to disk that is read by another.

For example, when an application A tries to read a file created by a different application B, it reads the file's key ID from plaintext file metadata, then queries the KA for the correct decryption key. If application A's unique ID does not have an ACL entry for Application B, the KA denies access. If it has access, the decryption key is returned over the secure inter-process communication channel.

When an application wants to communicate directly, a secure IPC channel between the two is established using AES GCM encryption using a common key retrieved from the KA or another suitable encryption mechanism. In this manner, secure sharing of encrypted files and IPC communications can occur between the trusted apps, managed by the keystore application that limits access.

FIG. 1 is an example of a prior art system for controlling application memory access. Referring to FIG. 1, a conventional computer 10 for operating a trusted process or address space maintains partitions or regions of memory 12 designated as "trusted." A CPU 30 directs memory accesses responsive to the OS 26, which occupies a high or low address region of memory (high address region in the example shown). An untrusted portion 20 maintains no particular supervisory control. A trusted memory portion 24 occupies the region below the OS 26, and a free portion 22 is allocated as processes in the untrusted 20 and trusted 24 portions grow towards each other.

The conventional operating system 26, before permitting a memory access by the CPU, checks the access to ensure it does not violate the trusted memory region 24. A memory access 40 from a process in the untrusted portion 20 to another process in the untrusted region 20 is allowed, as is a memory access 42 from the trusted region 24 to the trusted region 24. However, an access attempt 44 from the untrusted portion 20 to the trusted region 24 is disallowed, as shown by the "X" on purported access 44. The operating system, however, is required to take an integral role in scrutinizing each memory access to ensure the trusted memory portion 24 remains inaccessible to the untrusted portion 20. This generally requires a specialized operating system, or at least modifications to a standard operating system, for scrutinizing each memory access. Runtime performance implications are also imposed as each memory access triggers a range check. It would be beneficial to provide a trusted execution environment which allows trusted processes to communicate with other trusted processes, or apps, on an unmodified, vendor supplied OTS OS.

Figure 2:
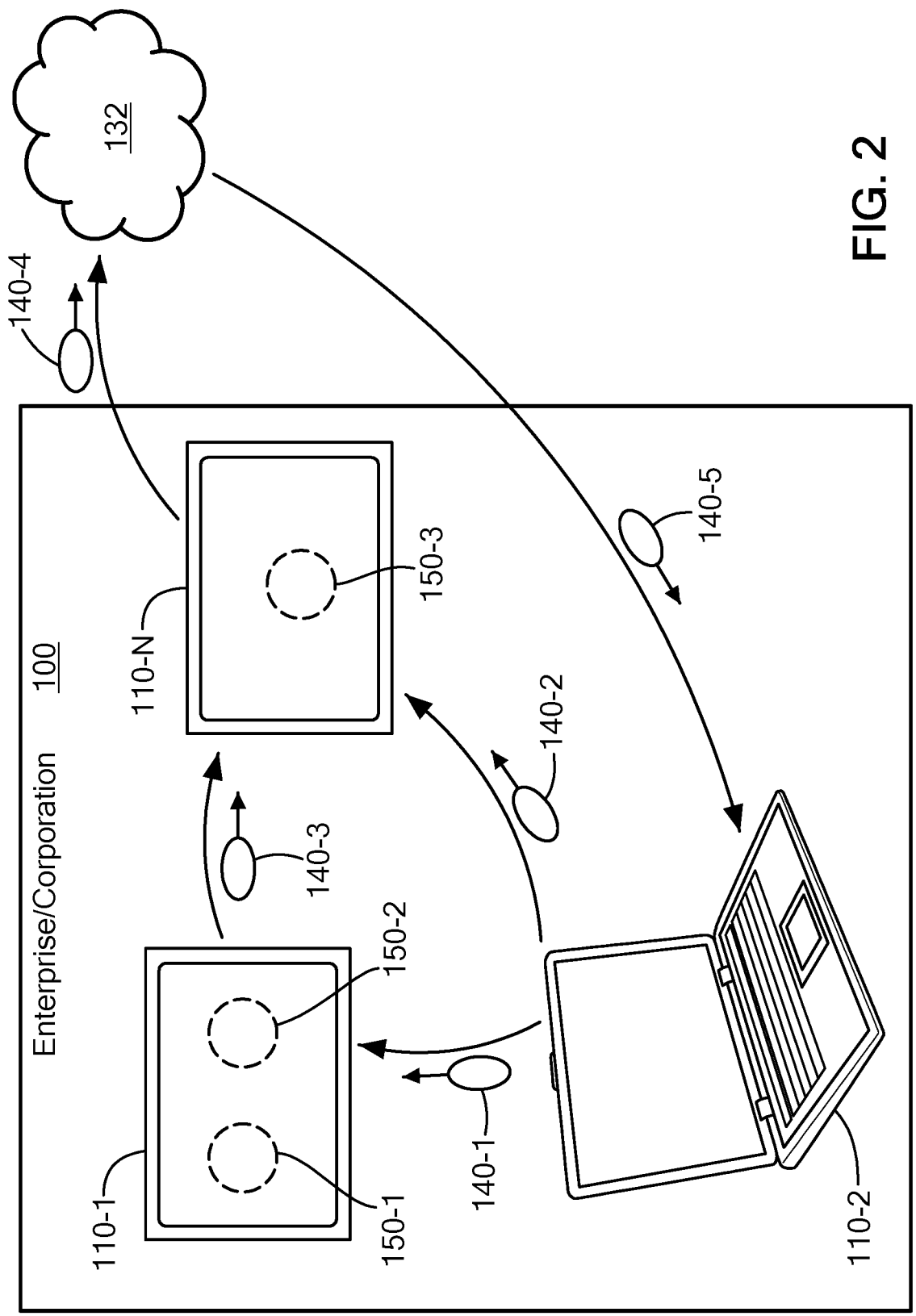
FIG. 2 is a context diagram of an enterprise environment suitable for use with configurations herein.

FIG. 2 is a context diagram of an enterprise environment suitable for use with configurations herein. Referring to FIG. 2, in an enterprise setting 100 such as a corporation or business having employees using a particular set or suite of apps for handling proprietary, or corporate sensitive, information invokes a number of portable computing devices 110-1 . . . 110-N (110 generally) for each employee. The computing devices 110 may be tablets, laptops, handheld or phone type devices, or may even be more stationary devices such as desktop computers. Each of the computing devices 110 executes apps 150-1 . . . 150-N (150 generally), which send messages 140-1 . . . 140-N (140 generally) to other apps 150 on the same or other computing devices 110, which may be remotely accessible over a public infrastructure network 132 such as the Internet. Each of the apps 150 is generally defined by a process running under the OS, however more complex apps may include more than one process. Messages 140 deemed trusted (140-1 . . . 140-4), as will be discussed further below, are permitted to be received by a recipient app, while untrusted messages 140-5 are disallowed.

Figure 3:
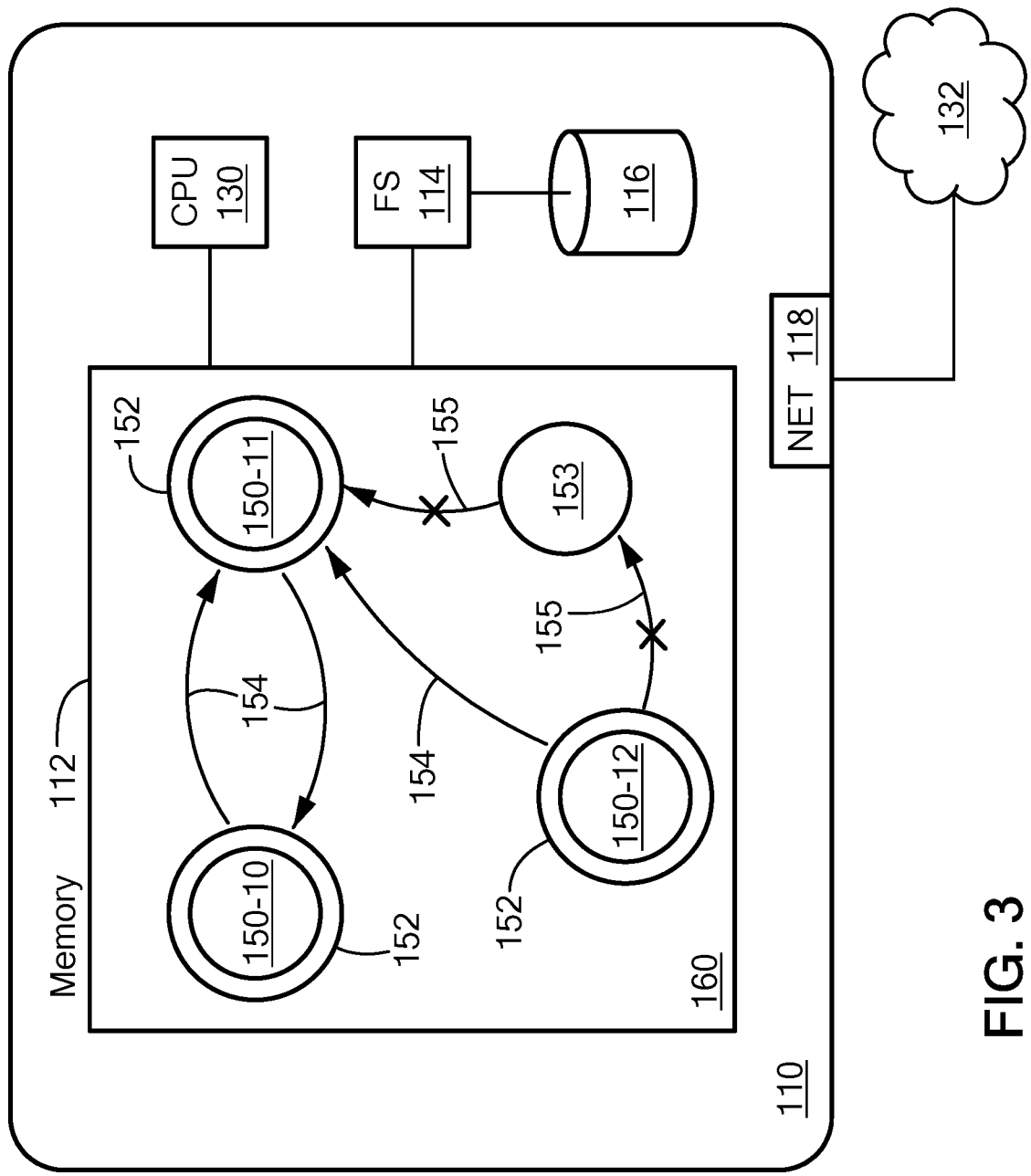
FIG. 3 is an architecture diagram of a computing device in the environment in FIG. 2.

FIG. 3 is an architecture diagram of a computing device 110 in the environment in FIG. 2. The computing device 110 typically includes a processor 130, memory 112, a file system 114 for accessing a storage volume 116, and a network interface 118 for accessing the network 132. Each of the computing devices 110 employs a trusted execution environment 160 for launching and executing the apps 150. The trusted execution environment 160 includes a set of processes, or apps, 150-10 . . . 150-12 in this example, including a wrapping layer 152 for monitoring messages and other accesses invoked by the process 150, as disclosed in further detail in copending U.S. patent application Ser. No. 14/208,068, filed Mar. 13, 2014, entitled "MODIFICATION OF COMPILED APPLICATIONS AND APPLICATION MANAGEMENT USING RETRIEVABLE POLICIES," incorporated herein by reference. Each of the processes 150 in the trusted group 150-N may communicate with other processes in the trusted group 150-N, as shown by message paths 154. Untrusted processes 153 outside the trusted group 150-N may not communicate with the trusted processes 150, as shown by blocked paths 155. The trusted execution environment 160 identifies an attempt to communicate with any of the apps 150 in the execution environment, and disallows the communication if a corresponding communication association is not found. In this manner, any number of apps, or processes, may be concurrently loaded into the same memory space 112 for invocation by the user, within the hardware limits of the device 110. The trusted environment disclosed herein prevents the trusted apps 150 from being accessed by any of the untrusted apps 153, without any other restrictions on execution or memory ranges in which each group (150, 153) of apps may reside.

Figure 4:
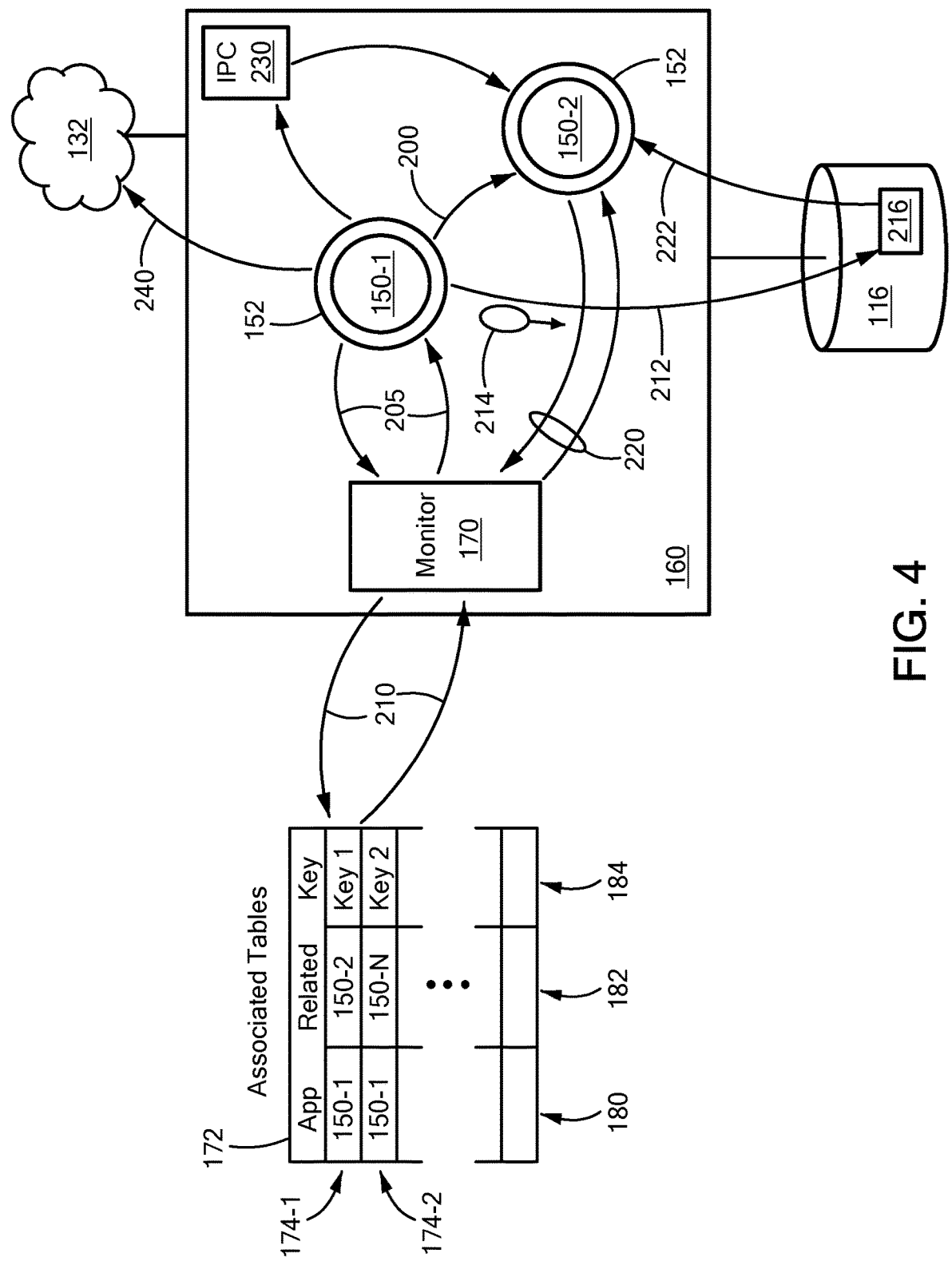
FIG. 4 shows a block diagram of the computing device in FIG. 3 according to configurations herein.

FIG. 4 shows a block diagram of the computing device in FIG. 3 according to configurations herein. Referring to FIGS. 2-4, the execution environment 160 on each of the trusted computing devices 110 includes a keystore application (KA) 170 for distributing keys for allowing interprocess communication between the processes 150 in the trusted group 150-N of apps. The KA securely holds all of the application keys when the trusted environment is not active, e.g., when the device is asleep or before a trusted app 150 has been started. When a trusted app 150 starts, it retrieves the corresponding file system and IPC keys from the KA. [Ed. Note: The keystore does not monitor IPC, it merely controls access to the keys that enable communication, and thereby controls which apps can communicate.]

The KA 170 maintains an association table 172 for defining access control between the apps 150. The association table 172 includes entries 174-1 . . . 174-N (174 generally) for denoting related apps 150 which may communicate with each other. Each entry 174 defines an app 180 and a related app 182 to which communication may be performed, denoted by app IDs or other unique identifier for identifying the app 150 on the computing device 110. Associations may be bidirectional or unidirectional depending on how the control system is implemented in alternate configurations. To support a unidirectional association, the table 172 may define source and destination apps, for example. The association entries 174 may also include a key 184 which is employed for encrypting data transferred between the processes. In a particular configuration, an app may have a master key which is then used to compute a file specific key for writing files 216 to and reading files 216 from the file system 116, as discussed further below.

Each app 150 may generally invoke one of three modes of interprocess communication (IPC): in-memory, file transfer, or network transmission. For example, continuing to refer to FIG. 4, the app 150-1 intends to communicate with another app 150-2 on the same device, as shown by arrow 200. The KA 170 examines the association table 172 for an entry 174 designating the apps 150-1, 150-2 as related, and thus permitted to communicate. Generally a match between an app ID of the apps 150-1, 150-2 and the app 180 and related apps 182 fields is performed, however other implementation such as a list of app IDs associated with a particular app 150 may be provided.

Control of in-memory IPC, which may be any suitable IPC mechanism as supported by the OS, such as shared memory or sockets, within the trusted app space can be achieved in either of two modes, a permissive mode, or a restrictive mode. In the permissive mode, when two apps 150-1 and 150-2 first want to communicate, they each request a key from the KA 170, arrows 205 and 220 in FIG. 4, then retain the common key in their private memory as long as each app is running. The stored key is then used to encrypt and decrypt any messages 200 between the two apps.

In the restrictive mode of in-memory IPC, continuing to refer to FIG. 4, app 150-1 initiates a message transmission to app 150-2 by a request exchange with the KA 170, as shown by arrows 205. The KA 170 performs a lookup in the association table 172, and identifies key 1 corresponding to the association between apps 150-1 and 150-2, from the key column 184. The sending app 150-1 encrypts a message 214 with the retrieved key 1, and writes the encrypted message 214 to an IPC channel 230 such as shared memory or other mechanism. The receiving app 150-2 queries the KA 170 for authority to receive communications from app 150-1, and upon positive verification also receives key 1, as shown by arrows 220. App 150-2 reads the encrypted message 214 from the IPC channel 230, and uses the received key 1 to decrypt the message. It should be noted that implementation of the restrictive mode of IPC control would likely have a performance impact with current hardware and OS choices.

The file system 116 generally serves the entire device 110 including both the trusted apps 150 and the untrusted apps 153. A trusted app 150 (the author app) creates a unique identifier for each file 216 that it writes to disk, and encrypts the contents of the file 216 using an algorithm that takes its master key 184 and the file identifier as inputs. The KA can provide the decryption key for the file 216 to another trusted app 150 (the recipient app) that is allowed access (per the association table 172) since it has the author app's master key 184 and the same algorithm for creating the file key. The KA uses the author key and the file 216 identifier to generate the decryption key which it passes to the recipient app. The resulting key allows communication between the author and recipient only through that particular file. In this manner, learning a file-specific key only exposes access to that one file.

When using network transmission, a trusted app 150 cannot encrypt the messages it sends or decrypt those it receives since it cannot assume a common keystore application between it and the remote system. Referring to FIG. 4, any messages 240 the trusted app 150 sends through the public Internet 132 must be secured through use of a virtual private network (VPN) that encrypts the network traffic and is only accessible to the trusted apps and trusted remote clients or servers.

Figure 5A:
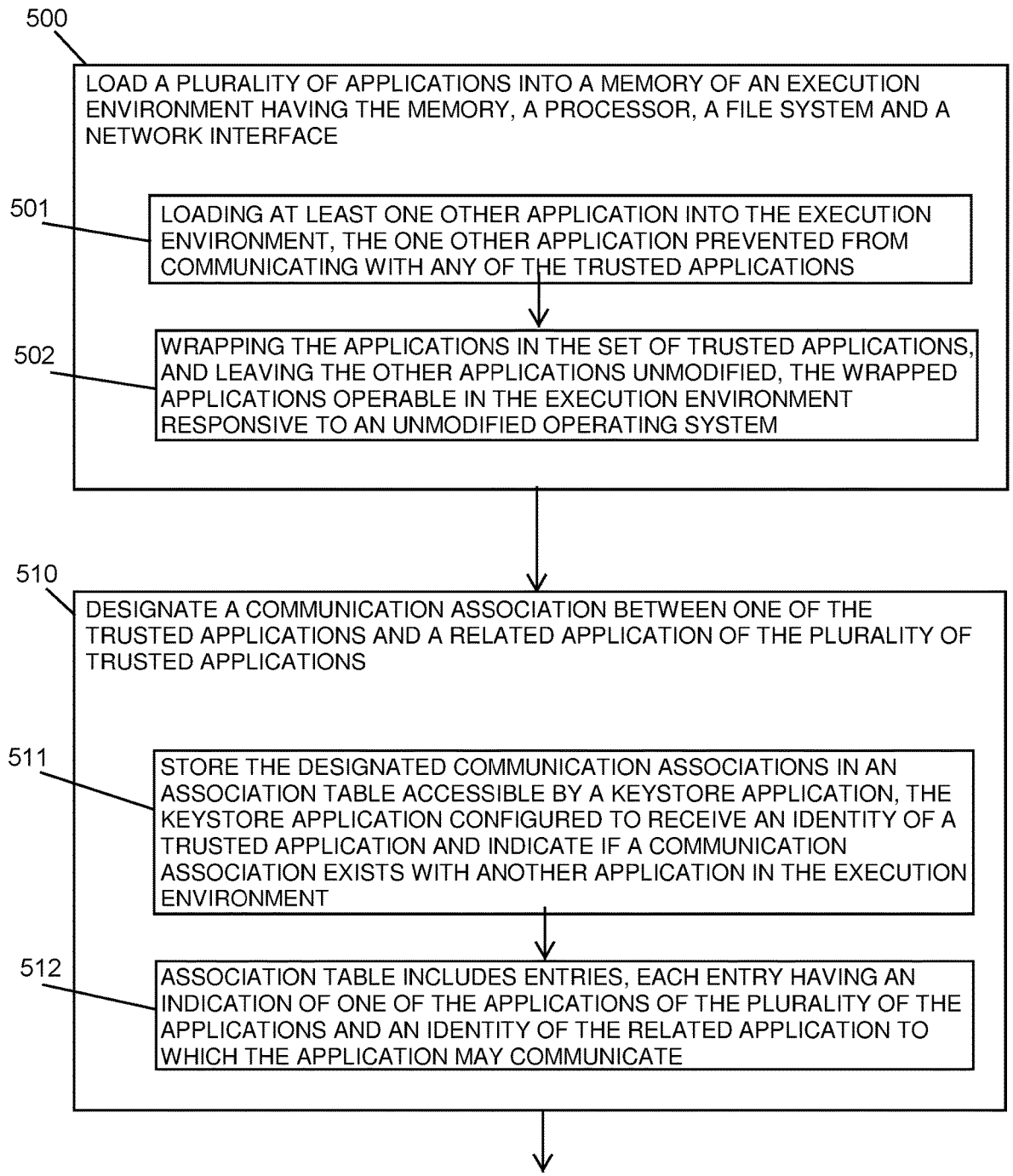
FIGS. 5A and 5B are a flowchart of application (app) execution in the computing device of FIG. 4.
Figure 5B:
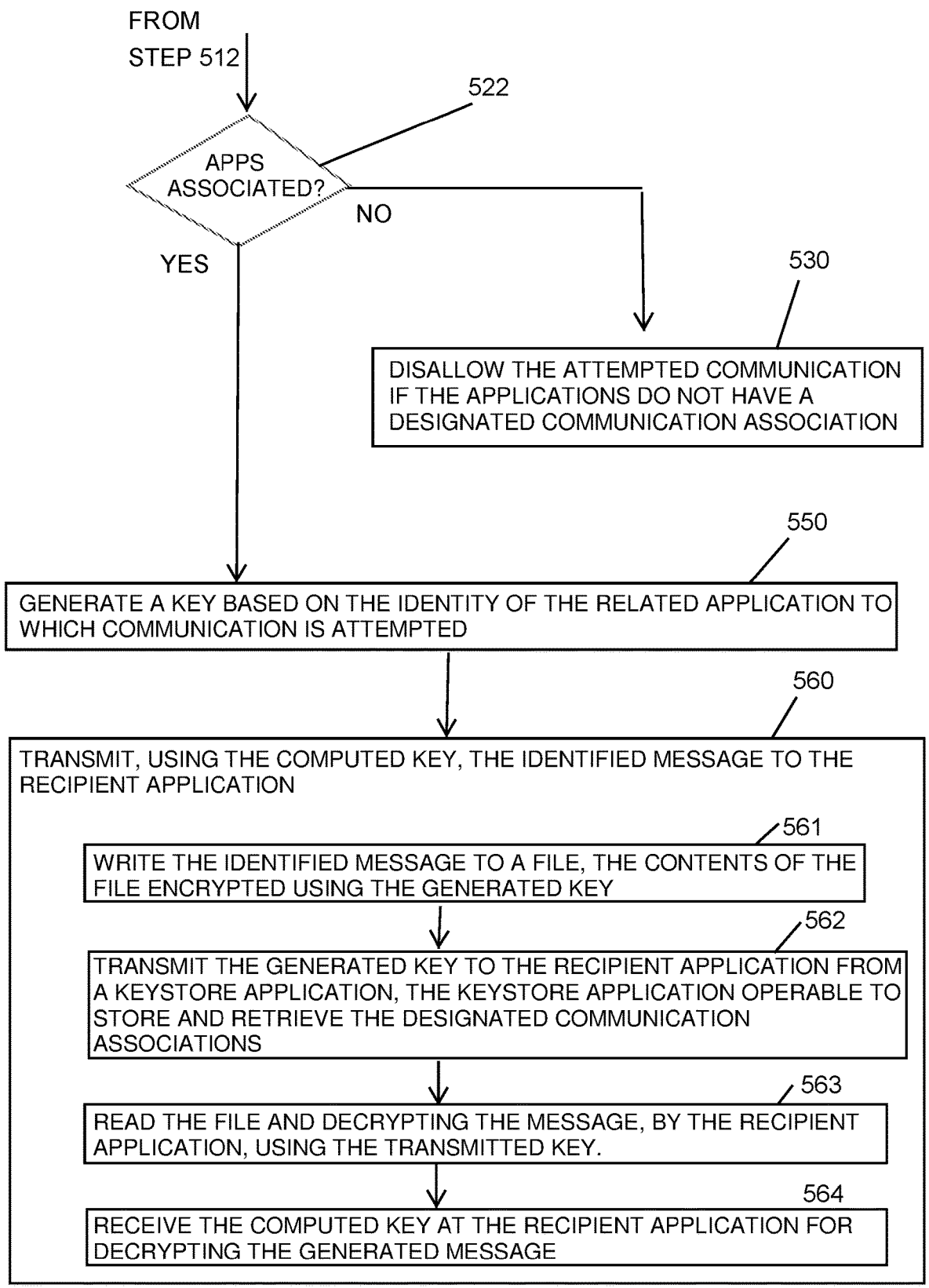

FIGS. 5A and 5B are a flowchart of application (app) execution in the computing device of FIG. 4. Referring to FIGS. 2-5B, at step 500, the method of providing a trusted execution environment 160 in a mobile computing device 110 as disclosed herein includes loading a plurality of trusted applications into the memory 112 of an execution environment 160, in which the execution environment has memory 112, a processor 130, a file system 114 and a network interface 118. In addition, at least one other (untrusted) application 153 may be loaded into the execution environment 160, such that the one other application is prevented from communicating with any of the trusted applications 150, as disclosed at step 501. Both trusted 150 and untrusted 153 applications can therefore coexist in the same address region and access the same file store 114, and execute on an unmodified OTS OS, without permitting the untrusted applications 153 to access or message the trusted applications 150.

Accordingly, in the example configuration, detecting an attempt to communicate includes wrapping the applications in the set of trusted applications, and leaving the other applications unmodified, such that the wrapped applications are operable in the execution environment 160 responsive to an unmodified operating system, as depicted at step 502. Wrapping may be performed by any suitable method, such as upon installation in the host device, by binding with DLLs (Dynamic Link Library), upon loading in preparation for launch, or other suitable mechanism, as disclosed more fully in the copending application cited above.

The execution environment 160 designates a communication association between one of the trusted applications and a related application of the plurality of trusted applications, as shown at step 510. In the example configuration, this includes storing the designated communication associations in an association table accessible by the KA 170, such that the KA 170 is configured to receive an identity of a trusted application 150, and indicate if a communication association exists with another application 150 in the execution environment 160, as depicted at step 511. The association table 172 includes a set of entries 174, in which each entry has an indication of one of the applications of the plurality of the applications and an identity of the related application to which the application may communicate, as shown at step 512. Alternate representations, such as lists, may also be employed.

The application wrapper 152 controls access to system calls and other invocations which could be used to access or transmit sensitive data from the wrapped app 150. The wrapper 152 detects an attempt to communicate by identifying file accesses, IPC accesses and network accesses for each of the trusted applications, such that the trusted applications 150-N define a set of trusted applications operable for communication only with other applications in the set of trusted applications exclusive of other applications in the memory (i.e. untrusted apps 153) outside the set of trusted applications.

A check is performed, at step 522, to determine if a communication association exists between the apps 150 in questions. If no match is found, than at least one of the apps 150 is not trusted, or in the trusted set. The KA 170 disallows the attempted communication if the applications do not have a designated communication association, as depicted at step 530. No keys are sent from the KA, removing an ability for the purported recipient app to interpret the transmitted message.

Otherwise, if the check at step 522 indicates that a communication association exists, the sending app identifies a message for transmission between the associated applications. The KA 170 generates a key based on the identity of the related application to which communication is attempted, as depicted at step 550. The sending app 150 transmits, using the computed key, the identified message to the recipient application 150, as shown at step 560.

If the transmission mode was via file transfer, then transmitting further includes writing the identified message to the file 216, such that the contents of the file 216 are encrypted using the generated key, as disclosed at step 561, and transmitting the generated key to the recipient application from the KA 170, such that the KA 170 is operable to store and retrieve the designated communication associations, as depicted at step 562.

The recipient app 150 receives the computed key at the recipient application for decrypting the generated message, as shown at step 563 reads the file 216 and decrypts the message using the transmitted key, as disclosed at step 564.

It will be appreciated by those skilled in the art that alternate configurations of the disclosed invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of providing an execution environment in a mobile computing device, comprising:
    loading a plurality of trusted applications into a memory of the execution environment, the execution environment having memory, a processor, a file system and a network interface;
    executing each of the plurality of trusted applications by the processor;
    maintaining, in a keystore application, an application key for each of the plurality of trusted applications;
    maintaining, in an associations table, a plurality of communication associations, wherein each communication association of the plurality of communication associations comprises an entry of the associations table, the entry comprising both a first identifier for a first application and a second identifier for a second application, the first application and the second application being selected from the plurality of trusted applications;
    detecting an attempt to communicate with a recipient application by an originating application, the recipient application and the originating application being selected from the plurality of trusted applications;
    determining that the associations table comprises an entry comprising an identifier of the recipient application and an identifier of the originating application; and
    providing, by the keystore application, a file key to the recipient application, wherein the file key is derived from an application key for the originating application;
    wherein the file key allows the recipient application to decrypt communications from the originating application.

2. The method of claim 1 further comprising loading at least one other untrusted application into the execution environment, the one other untrusted application being prevented from communicating with any of the trusted applications.

3. The method of claim 1 further comprising:
    identifying a message for transmission between the originating application and the recipient application;
    transmitting, using the file key, the identified message to the recipient application; and
    generating the file key at the recipient application for decrypting the identified message.

4. The method of claim 3 wherein transmitting further comprises:
    writing the identified message to a file, the contents of the file encrypted using the file key; and
    reading the file and decrypting the message, by the recipient application, using the file key.

5. The method of claim 3 wherein transmitting further comprises:
designating an IPC (Interprocess Communication) channel between the first application and the recipient application;
encrypting the identified message using the file key; and
transmitting the encrypted message to the recipient application from the originating application.

6. The method of claim 1 wherein detecting the attempt to communicate identifies file accesses, IPC accesses and network accesses for each of the trusted applications, the trusted applications defining a set of trusted applications operable for communication only with other applications in the set of trusted applications exclusive of other applications in the memory outside the set of trusted applications.

7. The method of claim 6 wherein detecting an attempt to communicate further comprises:
wrapping applications in the set of trusted applications, the wrapped applications operable in the execution environment responsive to an unmodified operating system.

8. A computing device for providing an execution environment, comprising:
a system comprising memory operable to receive a plurality of trusted applications defining an execution environment, the execution environment also having a processor, a file system and a network interface;
the processor operable to execute each of the plurality of trusted applications and to detect an attempt to communicate between an originating application and a recipient application of the trusted applications;
wherein a keystore application is configured to maintain a plurality of communication associations in an associations table, wherein each communication association of the plurality of communication associations comprises an entry of the associations table, the entry comprising both a first identifier for a first application and a second identifier for a second application, the first application and the second application being selected from the plurality of trusted applications, the keystore application being further configured to maintain an application key for each of the plurality of trusted applications;
wherein the processor determines that the associations table comprises an entry comprising an identifier of the recipient application and an identifier of the originating application and provides a file key to the recipient application, wherein the file key is derived from an application key for the originating application; and
wherein the file key allows the recipient application to decrypt communications from the originating application.

9. The device of claim 8 further permitting at least one other untrusted application into the execution environment, the one other untrusted application prevented from communicating with any of the trusted applications.

10. The device of claim 8 wherein the keystore application is operable to:
identify a message for transmission between the originating application and the recipient application; and
generate the file key at the recipient application for decrypting the identified message.

11. The device of claim 10 wherein transmitting further comprises:
a file for receiving and storing the identified message encrypted using the file key.

12. The device of claim 8 wherein detecting an attempt to communicate further comprises:
wrapping applications in the set of trusted applications, the wrapped applications operable in the execution environment responsive to an unmodified operating system.

13. A computer program product having instructions stored on a non-transitory computer readable storage medium for performing, in an enterprise environment, a method of providing an execution environment in a mobile computing device, the method comprising:
loading a plurality of trusted applications into a memory of the execution environment, the execution environment having memory, a processor, a file system and a network interface;
maintaining, in a keystore application, an application key for each of the plurality of trusted applications;
executing each of the plurality of trusted applications by the processor;
maintaining, in an associations table, a plurality of communication associations, wherein each communication association of the plurality of communication associations comprises an entry of the associations table, the entry comprising both a first identifier for a first application and a second identifier for a second application, the first application and the second application being selected from the plurality of trusted applications;
detecting an attempt to communicate with a recipient application by an originating application, the recipient application and the originating application being selected from the plurality of trusted applications;
determining that the associations table comprises an entry comprising an identifier of the recipient application and an identifier of the originating application; and
providing, by the keystore application, a file key to the recipient application, wherein the file key is derived from an application key for the originating application;
wherein the file key allows the recipient application to decrypt communications from the originating application.

14. The method of claim 3 wherein the method further comprises:
selecting a communication mode between the application, the communication mode being either one of a permissive mode or a restrictive mode;
retaining, when the permissive mode is selected, the generated key for subsequent communications between the associated processes; and
generating, when the restrictive mode is selected, a separate key for each subsequent communication between the associated processes.

* * * * *